United States Patent [19]

Wise

[11] Patent Number: 4,756,425
[45] Date of Patent: Jul. 12, 1988

[54] SINGLE WALL, NESTABLE/STACKABLE, ROTATABLE TANK

[75] Inventor: Thomas W. Wise, Oreland, Pa.

[73] Assignee: Plastech International, Inc., Warminster, Pa.

[21] Appl. No.: 26,880

[22] Filed: Mar. 17, 1987

Related U.S. Application Data

[63] Continuation of Ser. No. 730,440, May 6, 1985.

[51] Int. Cl.⁴ ............................................. B65D 21/04
[52] U.S. Cl. .................................... 206/596; 206/599; 206/518; 206/519; 426/124
[58] Field of Search ................ 220/408; 426/112, 124; 206/598, 599, 596, 518, 519, 520

[56] References Cited

U.S. PATENT DOCUMENTS

| | | | |
|---|---|---|---|
| 1,617,692 | 2/1927 | Villar | 426/124 |
| 1,818,924 | 8/1931 | Basmadjian | 426/124 |
| 2,638,338 | 5/1953 | Williams | 220/408 |
| 3,116,744 | 1/1964 | Hager | 220/408 |
| 3,521,777 | 7/1970 | Vik | 206/596 |
| 3,580,409 | 5/1971 | Soboleski | 426/124 |
| 3,623,631 | 11/1971 | Ford | 206/596 |
| 3,642,168 | 2/1972 | Wiley, Jr. et al. | 206/518 |
| 4,204,609 | 5/1980 | Kuhn | 220/408 |
| 4,316,540 | 2/1982 | Lapham | 206/518 |
| 4,351,448 | 9/1982 | Ingersoll et al. | 206/518 |

Primary Examiner—Joseph Man-Fu Moy
Attorney, Agent, or Firm—John F. A. Earley; John F. A. Earley, III

[57] ABSTRACT

A plastic tank for handling and storing large quantities of bulk material such as cucumbers in brine comprises a molded plastic tank having a bottom and four upwardly extending walls, a lip along the upper edges of the four walls, the walls including corner nesting stops for facilitating nesting and unnesting of the tank in a similar tank by limiting the distance an upper nesting tank extends into a lower nesting tank, the walls further including gussets extending from the walls of the tank to the outer portion of the lip for supporting the lip at the top of the four walls and for guiding a tank being lowered next to an adjacent tank into proper position, an interference ear at each of the lower corners of the tank to protect against tanks jamming together when nesting, the bottom of the tank including three parallel downwardly extending, hollow runners forming support members for the tank, the runners extending across the bottom of the tank, spaces formed at the ends of the runners for entry of tines of a forklift truck or a pallet jack, spaces between the runners for entry of tines of a forklift truck or a pallet jack and a depressor member for submerging the cucumbers in the brine.

38 Claims, 8 Drawing Sheets

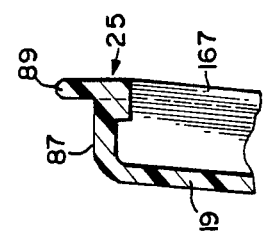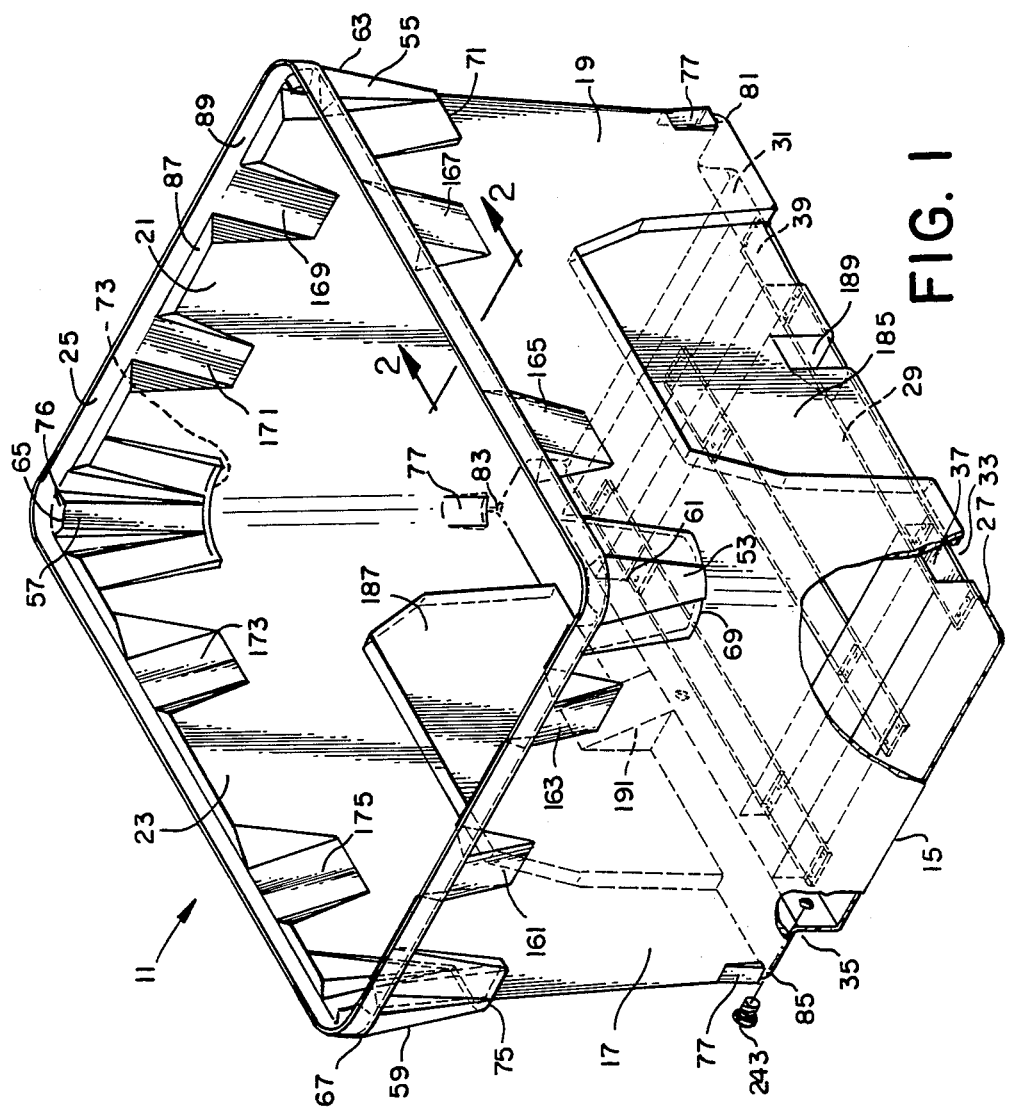

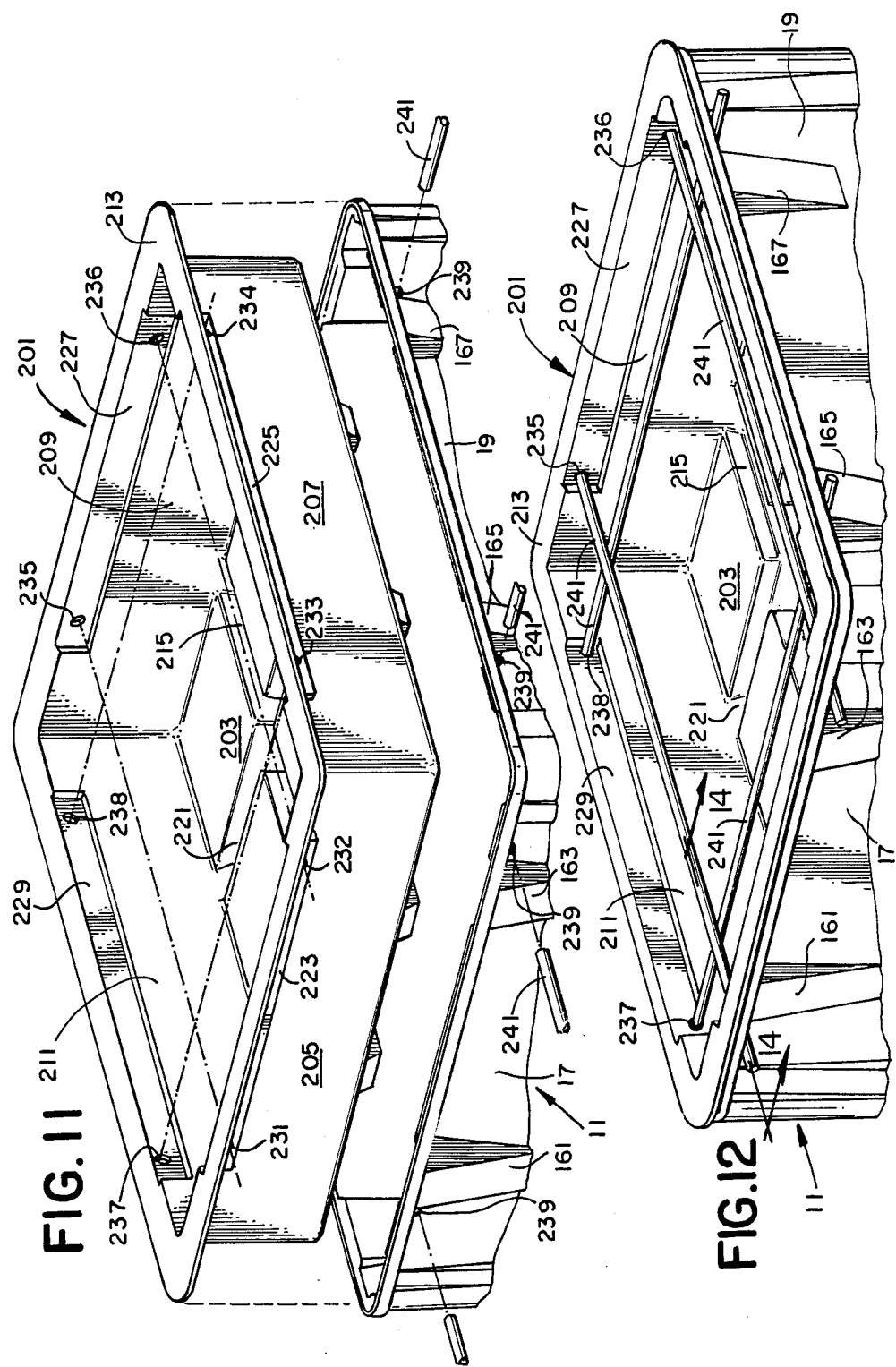

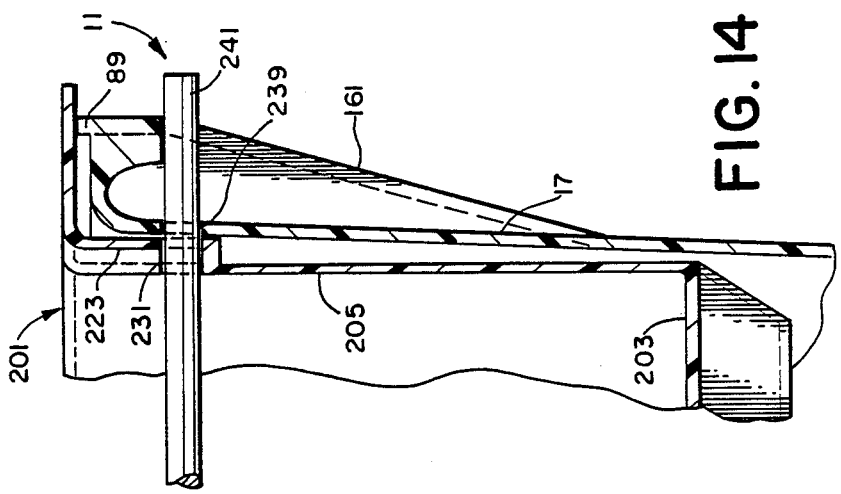
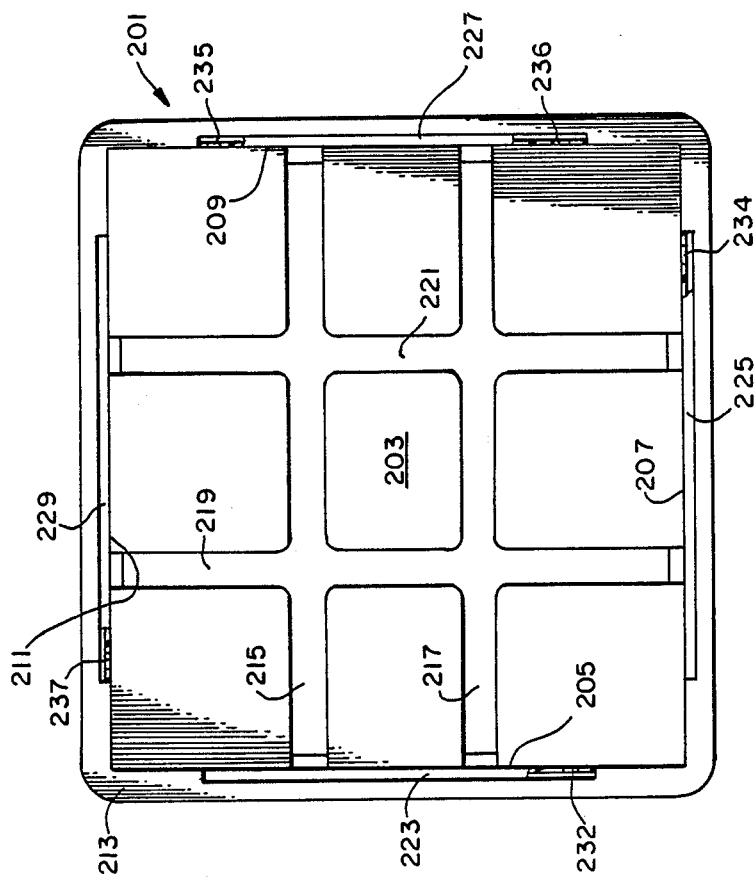

SINGLE WALL, NESTABLE/STACKABLE, ROTATABLE TANK

This is a continuation of application Ser. No. 730,440 filed on May 6, 1985.

BACKGROUND OF THE INVENTION

1. Field of the Invention

This invention relates to stackable containers for bulk materials, and more specifically concerns large containers for food and chemicals, for example, for holding cucumbers that are soaking in salt water to make pickles and for shipping pickles from one processor to another for further processing.

2. Description of the Prior Art

Brining typically is done in large 10,000 gallon wooden tanks outdoors in a field, where cucumbers are turned into pickles by soaking them in brine (salt water). The wooden tanks are easily damaged and are expensive to repair.

When the brining is completed, the pickles are transported in bins or containers to a processing plant where the pickles are made into relish or whatever. Bins or containers must be used to transport the pickles because the large wooden tanks, for the most part, cannot be shipped due to their size.

The bins or containers used to transport the pickles to the processing plant are typically made of wood, fiberglass, or stainless steel and are transported by forklift trucks or pallet jacks. They are subjected to rough handling from time to time, and may bang into walls, door jambs, or other obstructions. These bins or containers are easily damaged and are expensive to repair.

SUMMARY OF THE INVENTION

Objects of this invention are to provide a single wall plastic tank for holding large quantities of bulk material such as cucumbers in a brine solution, to provide a tank for transporting the bulk material for processing, and to provide a tank that resists damage.

Another object is to provide a single wall nestable tank molded of plastic in seamless one-piece contruction with gussets that reinforce a verticle peripheral lip of the tank, so that the gussets act like a shelf bracket to support the outside portion of the lip.

Another object is to provide a single wall nestable tank having corner nesting stops at the upper end of the tank and interference ears in each of the lower four corners of the tank to prevent tanks, when nesting one inside another, from jamming together.

Another object is to provide a plastic single wall tank for pickling cucumbers having a depressor member to keep the cucumbers submerged in a brine solution, side reinforcement bars to reinforce the side walls of the tank, and a drainage plug to release the brine solution when the cucumbers are pickles.

Another object is to provide a stackable tank that may be moved, lifted and inverted by a forklift truck.

BRIEF DESCRIPTION OF THE DRAWINGS

FIG. 1 is a perspective view of a tank constructed in accordance with this invention;

FIG. 2 is a view in section taken as indicated by the lines and arrows 2—2 that appear in FIG. 1;

FIG. 11 is a view in perspective of a depressor member made in accordance with this invention shown just before being positioned on the tank;

FIG. 12 is a view in perspective of the depressor member secured to the tank;

FIG. 13 is a view in top plan of the depressor member; and

FIG. 14 is a view in section taken as indicated by the lines and arrows 14—14 that appear in FIG. 12.

DETAILED DESCRIPTION

Figure 3:
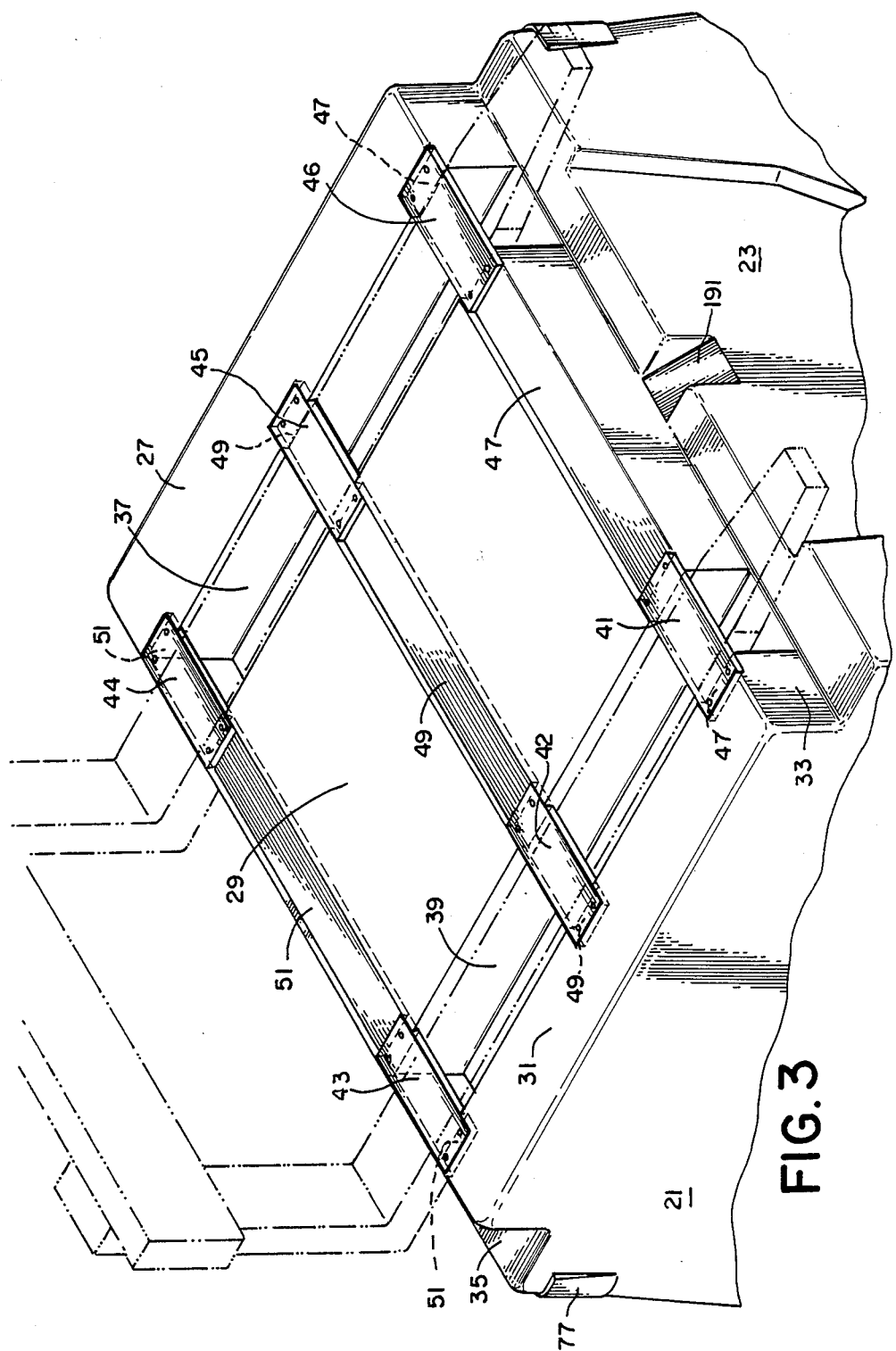
FIG. 3 is a partial view in perspective of the tank invention being inverted and supported by the tines of a forklift truck.

Turning now to the drawings, there is shown a tank 11 for holding, handling and storing large quantities of bulk material such as food products, which comprises a unitary molded plastic liquid-tight single wall tank 11 having a bottom wall 15, four upwardly extending walls 17, 19, 21 and 23, and a lip 25 along the upper edges of the four walls 17, 19, 21 and 23. Preferably, tank 11 has outside dimensions of 43¾ inches in width, 47 inches in length, and 46 inches in height.

In bottom wall 15 of tank 11, there are formed three parallel, laterally spaced, downwardly extending hollow runners or ridges 27, 29, and 31 that act as supporting members for the tank 11. These runners 27, 29, and 31 are integrally molded into bottom 15, and the bottoms of the runners 27, 29, and 31 are coplanar so that all three can rest simultaneously on a flat floor to support the tank 11.

Runners 27, 29, and 31 extend partially across bottom 15 of tank 11, and spaces 33 and 35 are formed at the ends of runners 27, 29, 31 and are perpendicular thereto for the entry of tines of a forklift truck or a pallet jack. Such tines may also enter recesses or spaces 37 and 39 formed between runners 27, 29 and 31.

In order to facilitate dumping of the contents of tank 11 by rotating it by rotating the tines of a forklift truck, plates 41, 42, 43, 44, 45 and 46 are mounted on the bottom of the depending runners 27, 29 and 31 across spaces 37 and 39 in three parallel spaced channels 47, 49 and 51. Preferably, plates 41–46 are made of ultrahigh molecular weight polyethylene so that plates 41–46 do not corrode and are resistant to abrasion. Each plate is bolted into 6 T-nuts molded in bottom wall 15.

Channels 47, 49 and 51 are provided in runners 27, 29 and 31 so that plates of various sizes may be used. Typically, plates 41–46 are one half inch in thickness, but may be thicker so that bottom wall 15 of tank 11 is elevated off the floor and tank 11 rests solely on the plates. With thicker plates, any abrasive wear occurs only on the plates and not on bottom wall 15 of tank 11.

The four side walls 17, 19, 21 and 23 are typically one-quarter inch in thickness, and slope slightly outwardly from bottom to top by a distance greater than the thickness of the walls to facilitate nesting and un-nesting when tanks 11 are not in use.

Figure 4:
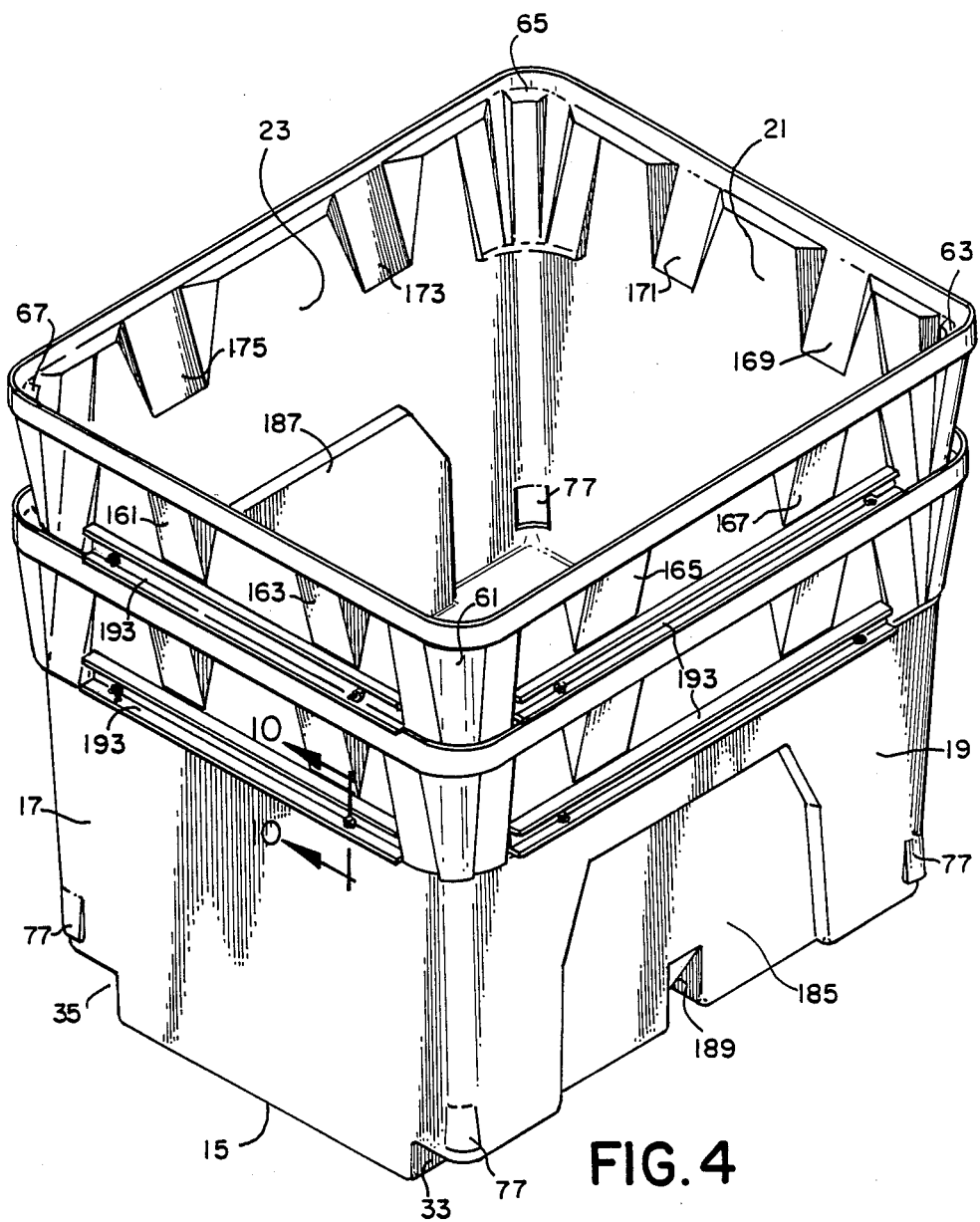
FIG. 4 is a perspective view of a plurality of tanks nesting.

In order to prevent tanks 11 from wedging together when nesting one inside another, tank 11 is provided with corner nesting stops 53, 55, 57 and 59, in the upper portion of the tank at corners 61, 63, 65 and 67, which extend downwardly 11½ inches from the top of tank 11 and slope outwardly from bottom to top. The bottom edges or shoulders 69, 71, 73 and 75 of the corner nesting stops extend outwardly from the four walls 17, 19, 21 and 23 by typically three-quarters of an inch, and when tanks 11 are nested together as shown in FIG. 4, bottom edges 69, 71, 73 and 75 of corner nesting stops 53, 55, 57 and 59 of an upper tank rest inside lip 25 of a lower tank. An inside corner nesting ledge 76 is provided to provide a larger area for contacting bottom edges 69, 71, 73 and 75.

Additionally, in order to facilitate nesting of a plurality of empty tanks 11 for storage and transportation, tank 11 is provided with an interference ear 77 in the lower portion of the tank at each corner 79, 81, 83 and 85 that prevents an upper tank from jamming in a lower tank if the bottom edges or shoulders 69, 71, 73 and 75 of corner nesting stops 53, 55, 57 and 59 of the upper tank slip past ledges 76 of the lower tank. As is shown in FIGS. 1, 3, 4 and 9, interference ears 77 slope outwardly from top to bottom, and prevent the bottom of the upper tank from sliding down too far in the lower tank. Interference ears 77 help center an upper tank during its descent into a lower tank when being nested, and prevent a vacuum from occurring between the bottoms of nested tanks.

Figure 6:
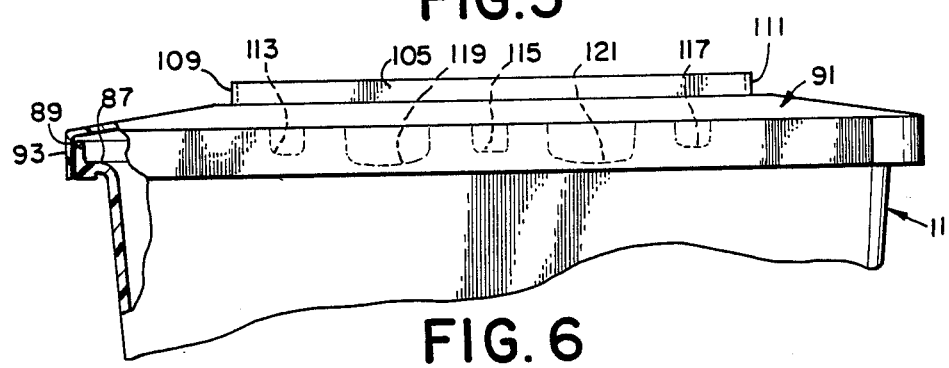
FIG. 6 is a partial view in section showing the dust cover of FIG. 5 mounted on the tank.

Lip 25 extends along the upper edges of the walls 17, 19, 21 and 23 and comprises, as shown in FIG. 2, a ledge 87 and a vertical lip wall 89. Lip 25, as is shown in FIG. 6, is adapted to support dust cover 91 which is tight fitting with skirt 93 overlying the tank vertical lip wall 89 in such a manner that the cover skirt 93 does not project outwardly unduly. Lip wall 89 is preferably 1½ inches high.

Figure 7:
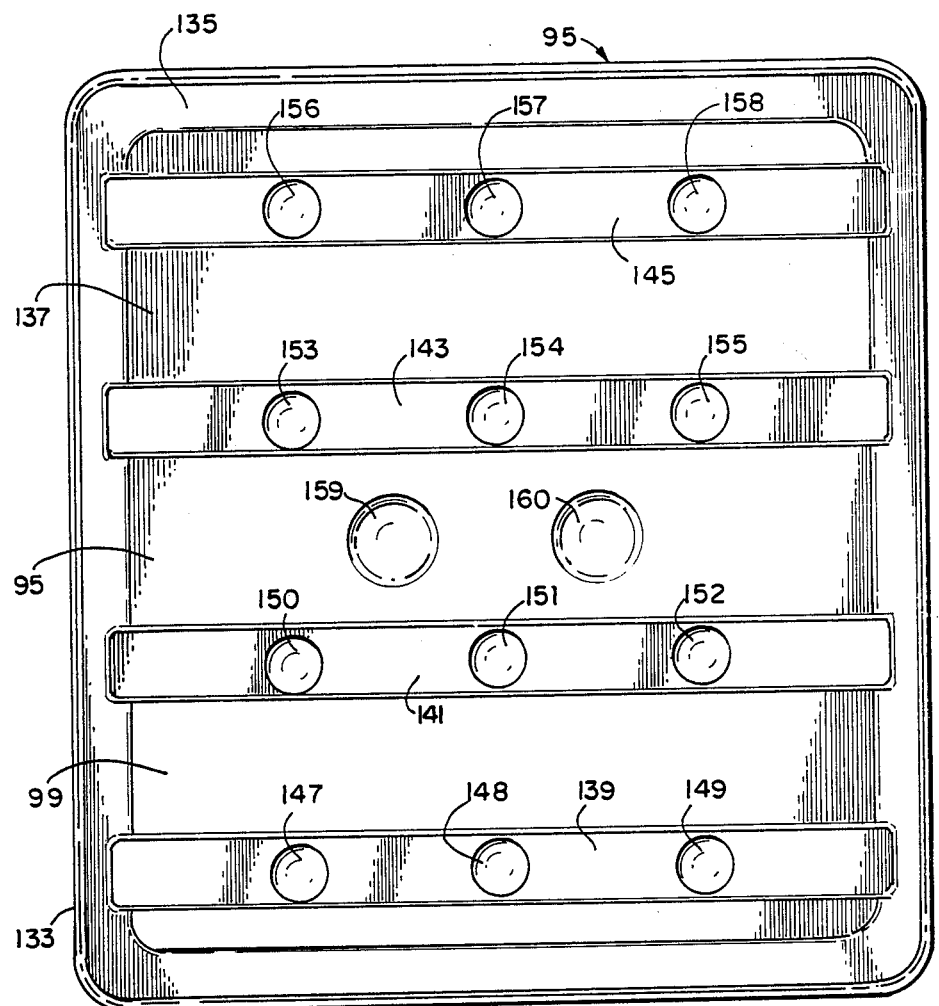
FIG. 7 is a view in bottom plan of a stacking lid, the top plan of the stacking lid being the same as appears in FIG. 5.
Figure 8:
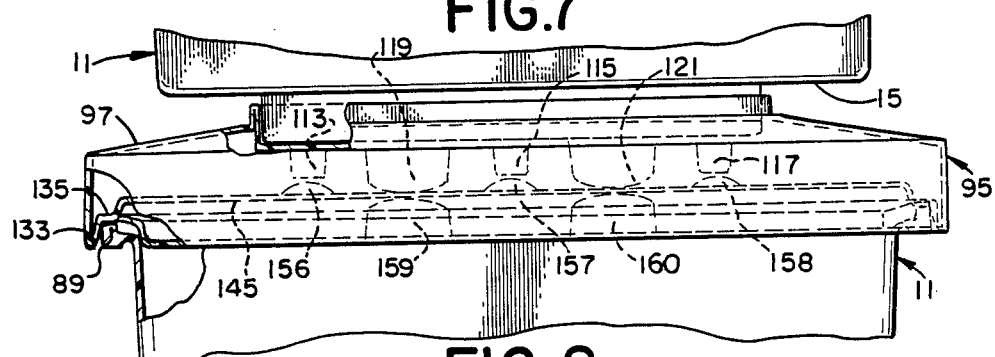
FIG. 8 is a partial view in section showing the stacking lid mounted on a tank with another tank resting upon the stacking lid.

Referring to FIGS. 7 and 8, tank 11 has a stacking lid 95 for use when tanks are to be stacked one upon another. Stacking lid 95 is a double-wall, one-piece cover that has a top portion 97, having the same structure as dust cover 91, joined to a bottom portion 99.

Figure 5:
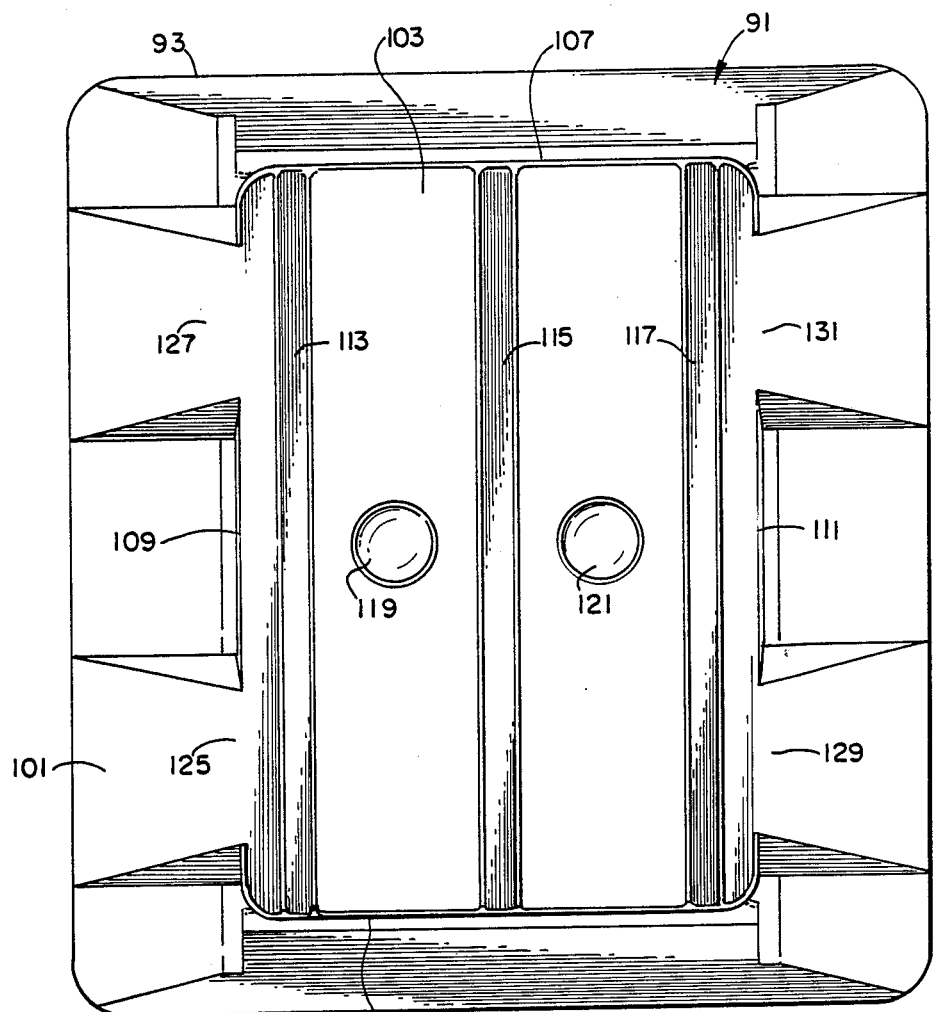
FIG. 5 is a view in top plan of a dust cover made in accordance with this invention.

As shown in FIG. 5, dust cover 91 and top portion 97 of stacking lid 95 have a top surface 101 with a rectangularly shaped center portion 103 defined by front and rear ridges 105 and 107 and side ridges 109 and 111. Center portion 103 has three parallel spaced channels 113, 115, and 117 that extend between front and rear ridges 105 and 107 of center portion 103. Center portion 103 also has two depressions or recesses 119 and 121 with depression 119 located between channels 113 and 115 and with depression 121 located between channels 115 and 117.

The bordering ridges surrounding center portion 103 are interrupted at gaps 125 and 127 in side ridge 109 and at gaps 129 and 131 in side ridge 111. Top surface 101 slopes downwardly from the bordering ridges toward skirt 93.

Bottom portion 99 of stacking lid 95 is molded to top portion 97 to form a double-wall skirt 113 that has a ledge 135 which sits on top of lip wall 89. Bottom portion 99 slopes downwardly from ledge 135 to a bottom surface 137 which extends into the top of tank 11.

Bottom surface 137 has four parallel spaced recesses or channels 139, 141, 143 and 145 that extend substantially the entire width of bottom surface 137 perpendicular to channels 113, 115 and 117 of the top portion 97 of the stacking lid 95.

There are three domes 147, 148 and 149 extending upwardly from channel 139, three domes 150, 151, and 152 extending upwardly from channel 141, three domes 153, 154 and 155 extending upwardly from channel 143, and three domes 156, 157 and 158 extending upwardly from channel 145. Domes 147, 150, 153 and 156 are aligned in a row whereby they are directly beneath channel 113 of top portion 97. Similarly, domes 148, 151, 154 and 157 are aligned in a row directly beneath channel 115 of top portion 97, and domes 149, 152, 155 and 158 are also aligned in a row directly beneath channel 117 of top portion 97.

Bottom portion 99 also has two domes 159 and 160 located between channels 141 and 143 and aligned so that dome 159 is directly beneath depression 119 of top portion 97 and dome 160 is directly beneath depression 121 of top portion 97.

As is shown in FIG. 8, when tanks are stacked, the three runners 27, 29 and 31 of an upper tank rest on top portion 97 of stacking lid 95 inside the bordering ridge around center portion 103. Top portion 97 of stacking lid 95 is reinforced by domes 147-160 of bottom portion 97 which contact and support the channels 113, 115 and 117 and depressions 119 and 121 of top portion 97.

Molded into the walls 17, 19, 21 and 23 of tank 11 are gussets 161, 163, 165, 169, 171, 173 and 175 that act as support means for the lip 25. Corner nesting stops 53, 55, 57 and 59 also support lip 25 in the same manner as the gussets. Each gusset provides support to lip 25 by reinforcing the lip ledge 87 which extends around the periphery of tank 11 and is flush with the outside periphery of lip wall 89. Each gusset also acts as a guide for a tank being lowered into a position next to another tank to guide or cam the tank being lowered into proper position.

In addition to acting as supports and guides, the corner nesting stops 53, 55, 57, 59 perform a third function, by acting as bumpers to protect the tank corners from damage due to impacts, for example, when a tank strikes a door jamb when being transported on a forklift truck.

The tank 11 may be molded with a recess 185 and recess 187 in opposing walls to reinforce the lower inner walls of the tank against deflection. Further, tank 11 may be molded with gussets 189, 191 at the lower portions of opposing walls to strengthen the attachment between the bottom and the walls of the tank.

Figure 10:
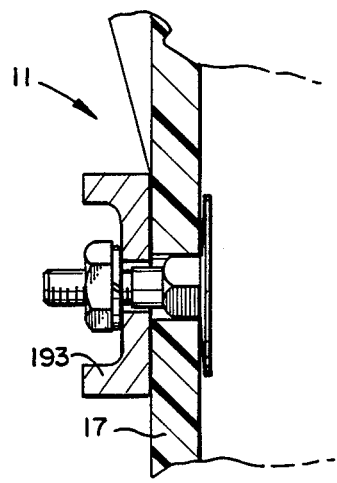
FIG. 10 is a view in section taken as indicated by the lines and arrows 10—10 in FIG. 4.

As shown in FIG. 4, each tank 11 may be provided with reinforcement bars 193 that are attached to the outside of walls 17, 19, 21 and 23 to reinforce them. Reinforcement bars 193 preferably are made of reinforced fiberglass and are bolted to walls 17, 19, 21 and 23 using elevator bolts as shown in FIG. 10.

Referring to FIGS. 11-14, tank 11 is also provided with a depressor member 201 that is attached to tank 11 to keep, for example, cucumbers submerged in a brine solution during a pickling process. Depressor member 201 has a bottom wall 203, four upwardly extending walls 205, 207, 209 and 211, and a lip 213.

In bottom wall 203 of depressor member 201, as is shown in FIG. 13, there are formed four ridges 215, 217, 219 and 221. Ridges 215 and 217 extend between wide walls 205 and 209 while ridges 219 and 221 are perpendicular to ridges 215 and 217 and extend between front wall 207 and rear wall 211.

Walls 205, 207, 209 and 211 have outwardly extending ridges 223, 225, 227, and 229, at their top portion just below lip 213, so that when depressor member 201 is positioned atop tank 11, ridges 223, 225, 227 and 229 fit snugly against the inside of walls 17, 19, 21 and 23 to prevent depressor member 201 from shifting laterally while in use.

Each ridge 223, 225, 227 and 229 has a pair of holes 231 and 232, 233 and 234, 235 and 236, 237 and 238. Holes 231 and 232 of ridge 223 are spaced opposite holes 235 and 236 of ridge 227, and holes 233 and 234 of ridge 225 are spaced opposite holes 237 and 238 of ridge 229. The holes inside walls 205 and 209 are also positioned closer to lip 213 than the holes in side walls 207 and 211.

For the pickling process, tank 11 is provided with holes 239 located near the top of each wall 17, 19, 21 and 23 and spaced so that when depressor member 201 is placed inside tank 11, holes 231-238 in depressor member 201 are aligned with holes 239 in tank 11.

In use, depressor member 201 is inserted into tank 11 so that lip 213 of depressor member 201 rests on lip 25 of tank 11. To secure depressor member 201 in place, rods 241 are inserted through the oppositely aligned holes in the side walls of depressor member 201 and tank 11. Rods 241 may be fiberglass threaded rods with nylon wing nuts to lock everything in tight so the cucumbers cannot creep up between the depressor member 201 and tank 11.

Figure 9:
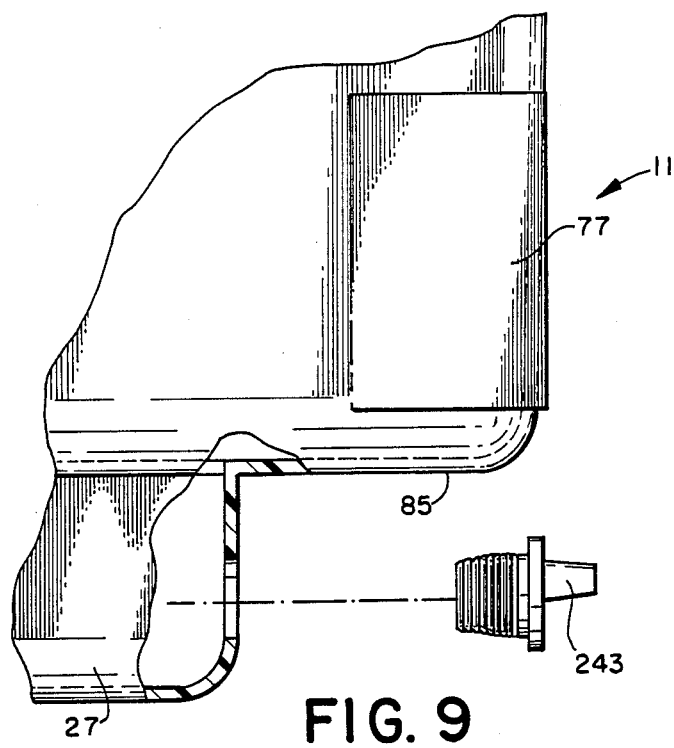
FIG. 9 is a partial view in section showing a drainage plug and an interference ear.

Tank 11 is also provided with a drain plug 243 near a lower corner of tank 11 such as corner 85 as is shown in FIG. 9.

In operation, when it is desired to brine, tank 11 is filled with cucumbers, the depressor member 201 is inserted into tank 11 and fixed in position by rods 241 with lip 213 of depressor member 201 resting on lip 25 of tank 11. The brine is poured into the tank 11 through the holes provided in depressor member 201, and the cucumbers are then allowed to pickle. The cucumbers soak up the brine and grow larger but are held submerged by depressor member 201. If the brine level becomes too low, more brine may be added by pouring it in through depressor member 201. If desired, after the pickling process is completed, the brine solution may be drained from tank 11 by opening drain plug 243, and the new pickles may be transported in tank 11 by a forklift truck to the processing plant for processing. After processing, such as by making the pickles into relish, the tank 11 may be used to transfer the relish to a packaging plant.

The inventive brine tank 11 has been approved by the United States Department of Agriculture (USDA). The equipment branch of the USDA must approve all equipment and supplies before they can be used in food processing plants which process foods for human consumption. The inventive brine tank was designed for and is being used by "edible" food processors, and USDA approval is required and has been granted. One requirement for approval is "ease of cleanability".

Prior single walled tanks have been made which were not approved by the USDA for use in "edible" food processing plants because they had nine small pockets in the inside bottom of the tank which were hard to clean. However, the nine small pockets provided for 4-way entry of fork lift truck tines, and this is an advantage. Subsequent tanks were provided with a bottom having three runners instead of the nine pockets, and these tanks received USDA approval. But, they provided only 2-way entry for the tines of the fork lift trucks. The tank of the present invention provides 4-way entry to a three runner tank that is USDA approved, by providing runner spaces 33, 35 and runner spaces 37, 39.

I claim:

1. A plastic tank for handling and storing large quantities of bulk material such as cucumbers, pickles, and other food products, comprising
  a molded plastic tank having a bottom and four walls extending upwardly from the bottom,
  a lip along the upper edges of the four upwardly extending walls,
  the walls including nesting stop means for facilitating nesting and unnesting of the tank in a similar tank by limiting the distance an upper nesting tank extends into a lower nesting tank,
  the walls further including lip support means extending from the walls for supporting the lip at the top of the four walls and for guiding a tank being lowered next to an adjacent tank into proper position,
  the bottom including three parallel spaced, downwardly extending, hollow runners integrally molded in the bottom and forming supporting members for the tank,
  the runners extending across the bottom wall of the tank,
  recesses formed at the ends of the runners adapted for entry of tines of a forklift truck or a pallet jack, and
  spaces between the runners for entry of the tines of a forklift truck or a pallet jack.

2. The tank of claim 1, the lip support means for supporting the lip being gussets extending from the walls of the tank to the outer portion of the lip.

3. The tank of claim 1, the lip having a horizontal lip ledge at the top of the side walls and a vertical lip wall extending upwardly from the outer portion of the lip ledge.

4. The tank of claim 1,
  the nesting means being nesting stops located in each corner of the upper portion of the tank,
  and an inside corner nesting ledge providing a larger surface to be contacted by a nesting stop.

5. The tank of claim 1, including
  corner gusset means for guiding a tank into position adjacent another tank, for supporting said lip, and for acting as bumpers to protect the tank corners from damage.

6. The tank of claim 1, also comprising a lid means adapted to fit over the lip of the tank for covering it.

7. The tank of claim 6,
  the lid means being a stacking lid for use when tanks are to be stacked one upon another,
  the stacking lid being a double-wall, one-piece cover having a top and a bottom portion,
  the top portion having downwardly extending domes and channels that are aligned with upwardly extending domes in the bottom portion so that the top portion is reinforced by the bottom portion when stacking a plurality of tanks.

8. The tank of claim 1, including
  a reinforcement bar attached to and extending across the walls of the tank to reinforce the walls.

9. The tank of claim 8,
  the reinforcement bars being made of reinforced fiberglass.

10. The tank of claim 1, further including an interference ear at each of the lower corners of the tank to protect against tanks jamming together when nesting.

11. The tank of claim 1, two of the four walls opposite to each other having a recess for reinforcement.

12. The tank of claim 1, further including a drain plug in a lower corner.

13. A plastic tank for handling and storing large quantities of bulk material such as cucumbers, pickles and other food products, comprising a molded plastic tank having a bottom and four walls extending upwardly from the bottom, a lip along the upper edges of the four upwardly extending walls, the walls including nesting stop means for facilitating nesting and unnesting of the tank in a similar tank by limiting the distance an upper nesting tank extends into a lower nesting tank, the bottom including three parallel spaced runners integrally molded into the bottom and forming supporting members for the tank, spaces between the runners for entry of the tines of a forklift truck, and plates mounted across the spaces between the runners for holding the tines of a forklift truck in the spaces to facilitate dumping of the bulk material contained in the tank by rotating the tines of the forklift truck.

14. The tank of claim 13, the plates being mounted in channels that extend across the runners perpendicular to the spaces between adjacent pairs of runners, and extend below the bottom of the tank.

15. The tank of claim 13, the plates being constructed from ultrahigh molecular weight polyethylene.

16. A plastic tank for handling and storing large quantities of bulk material such as cucumbers, pickles and other food products, comprising a molded plastic tank having a bottom and four walls extending upwardly from the bottom, a lip along the upper edges of the four upwardly-extending walls, the bottom including three parallel-spaced, downwardly-extending, hollow runners integrally molded in the bottom and forming supporting members of the tank, the runners extending across the bottom of the tank, spaces between the runners for entry of the tines of a fork lift truck or a pallet jack, and means adapted to be connected to the top portion of the tank for pushing against the top of the bulk material to submerge it in a brine solution.

17. The tank of claim 16, the means for pushing being a depressor member, the depressor member having a bottom and four upwardly extending walls and a lip, and the walls having outwardly extending ridges so that the depressor member fits snugly against the inside walls of the tank to prevent the depressor member from shifting laterally while in use, whereby the depressor member is secured inside the top of the tank to keep the bulk material submerged in the brine solution.

18. A plastic tank for handling and storing large quantities of bulk material such as cucumbers, pickles, and other food products, comprising a molded plastic tank having a bottom and four walls extending upwardly from the bottom, a lip along the upper edges of the four upwardly extending walls, the walls including nesting stop means for facilitating nesting and unnesting of the tank in a similar tank by limiting the distance an upper nesting tank extends into a lower nesting tank, the walls further including lip support means extending from the walls for supporting the lip at the top of the four walls and for guiding a tank being lowered next to an adjacent tank into proper position, the bottom including three parallel spaced, downwardly extending, hollow runners integrally molded in the bottom and forming supporting members for the tank, the runners extending across the bottom wall of the tank, recesses formed at the ends of the runners adapted for entry of tines of a forklift truck or a pallet jack, and spaces between the runners for entry of the tines of a forklift truck or a pallet jack, the lip support means for supporting the lip being gussets extending from the walls of the tank to the outer portion of the lip, the lip having a horizontal lip ledge at the top of the side walls and a vertical lip wall extending upwardly from the outer portion of the lip ledge, the nesting means being nesting stops located in each corner of the upper portion of the tank, and an inside corner nesting ledge providing a larger surface to be contacted by a nesting stop, corner gusset means for guiding a tank into position adjacent another tank, for supporting said lip, and for acting as bumpers to protect the tank corners from damage, a lid means adapted to fit over the lip of the tub for covering it, the lid means being a stacking lid for use when tanks are to be stacked one upon another, the stacking lid being a double-wall, one-piece cover having a top and a bottom portion, the top portion having downwardly extending domes and channels that are aligned with upwardly extending domes in the bottom portion so that the top portion is reinforced by the bottom portion when stacking a plurality of tanks, a reinforcement bar attached to and extending across the walls of the tank to reinforce the walls, the reinforcement bars being made of reinforced fiberglass, an interference ear at each of the lower corners of the tank to protect against tanks jamming together when nesting, two of the four walls opposite to each other having a recess for reinforcement, and a drain plug in a lower corner.

19. A plastic tank for handling and storing large quantities of bulk material such as cucumbers, pickles and other food products, comprising a molded plastic tank having a bottom and four walls extending upwardly from the bottom, a lip along the upper edges of the four upwardly extending walls, the walls including nesting stop means for facilitating nesting and unnesting of the tank in a similar tank by limiting the distance an upper nesting tank extends into a lower nesting tank, the bottom including three parallel spaced runners integrally molded into the bottom and forming supporting members for the tank, spaces between the runners for entry of the tines of a forklift truck, and plates mounted across the spaces between the runners for holding the tines of a forklift truck in the spaces to facilitate dumping of the bulk material contained in the tank by rotating the tines of the forklift truck, the plates being mounted in channels that extend across the runners perpendicular to the spaces between adjacent pairs of runners, and extend below the bottom of the tank, the plates being constructed from ultrahigh molecular weight polyethylene.

20. A plastic tank for handling and storing large quantities of bulk material such as cucumbers, pickles and other food products, comprising a molded plastic tank having a bottom and four walls extending upwardly from the bottom, a lip along the upper edges of the four upwardly-extending walls, the bottom including three parallel-spaced, downwardly-extending, hollow runners integrally molded in the bottom and forming supporting members of the tank, the runners extending across the bottom wall of the tank, spaces between the runners for entry of the tines of a fork lift truck or a pallet jack, and means adapted to be connected to the top portion of the tank for pushing against the top of the bulk material to submerge it in a brine solution, the means for pushing being a depressor member, the depressor member having a bottom and four upwardly-extending walls and a lip, and the walls having an outwardly-extending ridges so that the depressor member fits snuggly against the inside walls of the tank to prevent the depressor member from shifting laterally while in use, whereby the depressor member is secured inside the top of the tank to keep the bulk materials submerged in the brine solution.

21. The tank of claim 16, further including recesses formed at the ends of the runners adapted for entry of tines of a forklift truck or a pallet jack.

22. The tank of claim 16, the walls including nesting stop means for facilitating nesting and unnesting of the tank in a similar tank by limiting the distance an upper nesting tank extends into a lower nesting tank, the walls further including lip support means extending from the walls for supporting the lip at the top of the four walls and for guiding a tank being lowered next to an adjacent tank into proper position.

23. The tank of claim 22, the lip support means for supporting the lip being gussets extending from the walls of the tank to the outer portion of the lip.

24. The tank of claim 16, the lip having a horizontal lip ledge at the top of the side walls and a vertical lip wall extending upwardly from the outer portion of the lip ledge.

25. The tank of claim 22, the nesting means being nesting stops located in each corner of the upper portion of the tank, and an inside corner nesting ledge providing a larger surface to be contacted by the nesting stop.

26. The tank of claim 16, further including corner gusset means for guiding a tank into position adjacent another tank, for supporting said lip, and for acting as bumpers to protect the tank corners from damage.

27. The tank of claim 16, further including a lid means adapted to fit over the lip of the tank for covering it.

28. The tank of claim 27, the lid means being stacking lid for use when tanks are to be stacked one upon another, the stacking lid being a double-wall, one-piece cover having a top and a bottom portion, the top portion having downwardly extending domes and channels that are aligned with upwardly extending domes in the bottom portion so that the top portion is reinforced by the bottom portion when stacking a plurality of tanks.

29. The tank of claim 16, further including a reinforcement bar attached to and extending across the walls of the tank to reinforce the walls.

30. The tank of claim 29, the reinforcement bars being made of reinforced fiberglass.

31. The tank of claim 16, further including an interference ear at each of the lower corners of the tank to protect against tank jamming together when nesting.

32. The tank of claim 16, two of the four walls opposite to each other having a recess for reinforcement.

33. The tank of claim 16, further including a drain plug in a lower corner.

34. The tank of claim 16, further including plates mounted across the spaces between the runners for holding the tines of a forklift truck in the spaces to facilitate dumping of the bulk material contained in the tank by rotating the tines of the forklift truck.

35. The tank of claim 34, the plates being mounted in channels that extend across the runners perpendicular to the spaces between adjacent pairs of runners, and extend below the bottom of the tank.

36. The tank of claim 34, the plates being consstructed from ultrahigh molecular weight polyethylene.

37. A plastic tank for handling and storing large quantities of bulk material such as cucumbers, pickles and other food products, comprising a molded plastic tank having a bottom and four walls extending upwardly from the bottom, a lip along the upper edges of the four upwardly extending walls, the bottom including three parallel spaced, downwardly extending, hollow runners integrally molded in the bottom and forming supporting members for the tank, the runners extending across the bottom wall of the tank, spaces between the runners for entry of the tines of a forklift truck of a pallet jack, means adapted to be connected to the top portion of the tank for pushing against the top of the bulk material to submerge it in a brine solution, the means for pushing being a depressor member, the depressor member having a bottom and four upwardly extending walls and a lip, and the walls having outwardly extending ridges so that the depressor member fits snugly against the inside walls of the tank to prevent the depressor member from shifting laterally while in use, whereby the depressor member is secured inside the top of the tank to keep the bulk, material submerged in the brine solution, recesses formed at the ends of the runners adapted for entry of tines of a forklift truck or a pallet jack, the walls including nesting stop means for facilitating nesting and unnnesting of the tank in a similar tank by limiting the distance an upper nesting tank extends into a lower nesting tank, the walls further including lip support means extending from the walls for supporting the lip at the top of the four walls and for guiding a tank being lowered next to an adjacent tank into proper position, the lip support means for supporting the lip being gussets extending from the walls of the tank to the outer portion of the lip, the lip having a horizontal lip ledge at the top of the side walls and a vertical lip wall extending upwardly from the outer portion of the lip ledge, the nesting means being nesting stops located in each corner of the upper portion of the tank, and an inside corner nesting ledge providing a larger surface to be contacted by a nesting stop, corner gusset means for guiding a tank into position adjacent another tank, for supporting said lip, and for acting as bumpers to protect the tank corners from damage, a reinforcement bar attached to and extending across the walls of the tank to reinforce the walls, the reinforcement bars being made of reinforced fiberglass, an interference ear at each of the lower corners of the tank to protect against tanks jamming together when nesting, two of the four walls opposite to each other having a recess for reinforcement, a drain plug in a lower corner, plates mounted across the spaces between the runners for holding the tines of a forklift truck in the spaces to facilitate dumping of the bulk material contained in the tank by rotating the tines of the forklift truck, the plates being mounted in channels that extend across the runners perpendicular to the spaces between adjacent pairs of runners, and extend below the bottom of the tank, the plates being constructed from ultrahigh molecular weight polyethylene.

38. The tank of claim 37, further including a lid means adapted to fit over the lip of the tank for covering it.

* * * * *